(12) United States Patent
Serzedello

(10) Patent No.: US 11,361,205 B2
(45) Date of Patent: Jun. 14, 2022

(54) DUPLICATION DEVICE FOR KEY FOBS

(71) Applicant: THE HILLMAN GROUP, INC., Cincinnati, OH (US)

(72) Inventor: Rodrigo Serzedello, Carlsbad, CA (US)

(73) Assignee: The Hillman Group, Inc., Cincinnati, OH (US)

( * ) Notice: Subject to any disclaimer, the term of this patent is extended or adjusted under 35 U.S.C. 154(b) by 0 days.

(21) Appl. No.: 17/003,001

(22) Filed: Aug. 26, 2020

(65) Prior Publication Data

US 2022/0067471 A1 Mar. 3, 2022

(51) Int. Cl.
*G06K 19/07* (2006.01)
*H04L 9/08* (2006.01)

(52) U.S. Cl.
CPC ........ *G06K 19/0723* (2013.01); *H04L 9/0869* (2013.01)

(58) Field of Classification Search
CPC .......................... G06K 19/0723; H04L 9/0869
See application file for complete search history.

(56) References Cited

U.S. PATENT DOCUMENTS

| | | | |
|---|---|---|---|
| 6,160,488 A | 12/2000 | Honda | |
| 10,706,653 B2 | 7/2020 | Yorkston | |
| 2009/0051497 A1* | 2/2009 | Miyaso | H04N 1/00835 340/10.4 |
| 2010/0007497 A1* | 1/2010 | Takeda | G07C 9/00857 340/572.1 |
| 2012/0159152 A1 | 6/2012 | Ha et al. | |
| 2018/0122171 A1 | 5/2018 | Pearson | |
| 2020/0013241 A1* | 1/2020 | Johnson | B60R 25/248 |
| 2021/0245319 A1* | 8/2021 | Robertson | B23Q 35/02 |

FOREIGN PATENT DOCUMENTS

JP 2007-309015 11/2007

OTHER PUBLICATIONS

Nicholas T. Courtois, "Card-Only Attacks on MiFare Classic," RFIDSec, 2009 (available at https://www.cosic.esat.kuleuven.be/rtidsec09/Papers/mifare_courtois_rfidsec09.pdf).
U.S. Design Patent Application of Rodrigo Serzedello, entitled "Wireless Fob Duplication Device," filed Aug. 26, 2020.
Extended European Search Report, dated Jan. 25, 2022, issued by the European Patent Office in corresponding Patent Application No. 21187555.4-1009 (9 pages).

* cited by examiner

*Primary Examiner* — Sonji N Johnson
(74) *Attorney, Agent, or Firm* — Finnegan, Henderson, Farabow, Garrett & Dunner LLP

(57) ABSTRACT

A key fob duplication device is disclosed. The duplication device may have a housing and a display device attached to the housing. The duplication device may also have a controller enclosed within the housing. The controller may read data stored in the first key fob. The controller may also determine whether the first key fob can be duplicated based on the data. When the data indicates that the first key fob can be duplicated, the controller may write the data of the first key fob and an indicator value on a second key fob. The indicator value may indicate that the second key fob cannot be duplicated. When, however, the data indicates that the first key fob cannot be duplicated, the controller may display a message on the display device, indicating that the first key fob cannot be duplicated.

19 Claims, 7 Drawing Sheets

DUPLICATION DEVICE FOR KEY FOBS

TECHNICAL FIELD

The present disclosure relates generally to a duplication device and more particularly to a duplication device for key fobs.

BACKGROUND

Key fobs or wireless tags are often used to provide access to buildings or facilities instead of using the well-known physical locks and keys used to secure gates or doors of such facilities. For example, key fobs may allow a user to unlock apartment gates or doors, access common areas such as gymnasiums or pools in an apartment complex, or unlock the doors on commercial buildings. Key fobs are also sometimes used to provide user access to an electronic device such as a desktop or laptop computer. In such applications, the apartment gate, door, or electronic device typically includes a reader capable of reading the digital information stored on the key fob. The reader compares the digital information of the key fob with stored digital information and unlocks the gate or door, or allows user access to the electronic device if the two pieces of digital information match each other.

Conventional key fobs or wireless tags include radio frequency identification devices (RFIDs). The reader includes an antenna that emits an electromagnetic field, which when received by the key fob causes the information stored on the key fob to be read by the reader. The electromagnetic field may be associated with different frequencies. For example, conventionally, electromagnetic fields having a relatively low frequency of about 125-135 KHz or a relatively high frequency of about 13.56 MHz are employed to activate RFID key fobs. The data stored on key fobs designed for activation by low-frequency electromagnetic fields may not be encrypted, whereas the data stored on key fobs designed for activation by high-frequency electromagnetic fields is usually encrypted. Such encrypted key fobs may be used to control access to, for example, high security installations, office buildings, etc.

A user may desire to make a duplicate of a key fob for a variety of reasons. For example, the user may wish to provide access to the user's home, apartment, or office to a visiting guest or to a trusted house keeper, etc. A user may also wish to have one or more duplicate key fobs so that the user may be able to access a facility when the user forgets to bring the original key fob, misplaces the original key fob, or loses the original key fob. Duplication of key fobs, however, has been difficult and/or time consuming. For example, encrypted key fobs have been difficult to duplicate. Moreover, in many cases, a vendor duplicates the key fob at a remote facility and then mails the duplicate key fob to the user. As a result, the user must wait to receive the duplicate fob before being able to use it. Therefore, there is a need for an easy to use key fob duplication device that can provide a user with a duplicate key fob quickly and conveniently.

The key fob duplication device of the present disclosure solves one or more of the problems set forth above and/or other problems of the prior art.

SUMMARY

In one aspect, the present disclosure is directed to a key fob duplication device. The duplication device may include a housing and a display device attached to the housing. The duplication device may also include a controller enclosed within the housing. The controller may be configured to read data stored in the first key fob. The controller may also be configured to determine whether the first key fob can be duplicated based on the data. When the data indicates that the first key fob can be duplicated, the controller may be configured to write the data of the first key fob and an indicator value on a second key fob. The indicator value may be configured to indicate that the second key fob cannot be duplicated. When the data indicates that the first key fob cannot be duplicated, the controller may be configured to display a message on the display device, indicating that the first key fob cannot be duplicated.

In another aspect, the present disclosure is directed to a method of duplicating a key fob. The method may include reading, using a controller, data stored in a first key fob. The method may also include determining, using the controller, whether the first key fob can be duplicated based on the data. When the controller determines that the first key fob can be duplicated, the method may include writing, using the controller, the data of the first key fob and an indicator value on the second key fob in response to receiving the input. The indicator value may be configured to indicate that the second key fob is a copy of the first key fob. The method may include verifying, using the controller, that data stored in the second key fob corresponds to the data stored in the first key fob, and displaying, on a display device, a first message indicating that the first key fob has been duplicated. When the controller determines that the first key fob cannot be duplicated, the method may include displaying, on the display device, a second message indicating that the first key fob cannot be duplicated.

In yet another aspect, the present disclosure is directed to another method of duplicating a key fob. The method may include receiving, using an input device, identification information from a user. The method may also include retrieving, from a database, data of a first key fob stored in association with the identification information. Further, the method may include writing, using the controller, the data of the first key fob and an indicator value on the second key fob. The indicator value may be configured to indicate that the second key fob cannot be duplicated. The method may include verifying, using the controller, that data stored in the second key fob corresponds to the data retrieved from the database. The method may also include displaying, on a display device, a message indicating that the first key fob has been duplicated.

DETAILED DESCRIPTION

Figure 1:
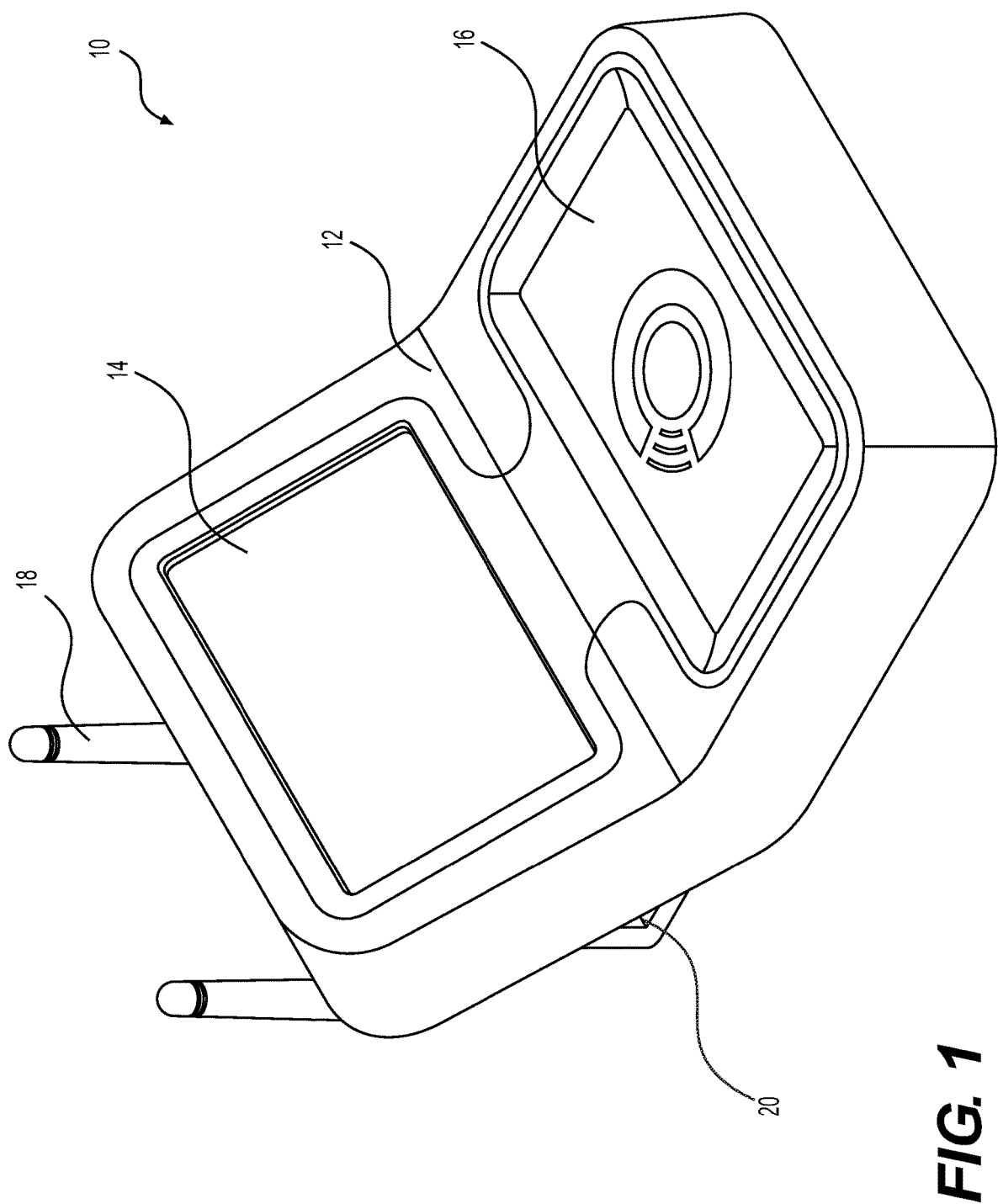
FIG. 1 is an illustration of an exemplary key fob duplication device.
Figure 7:
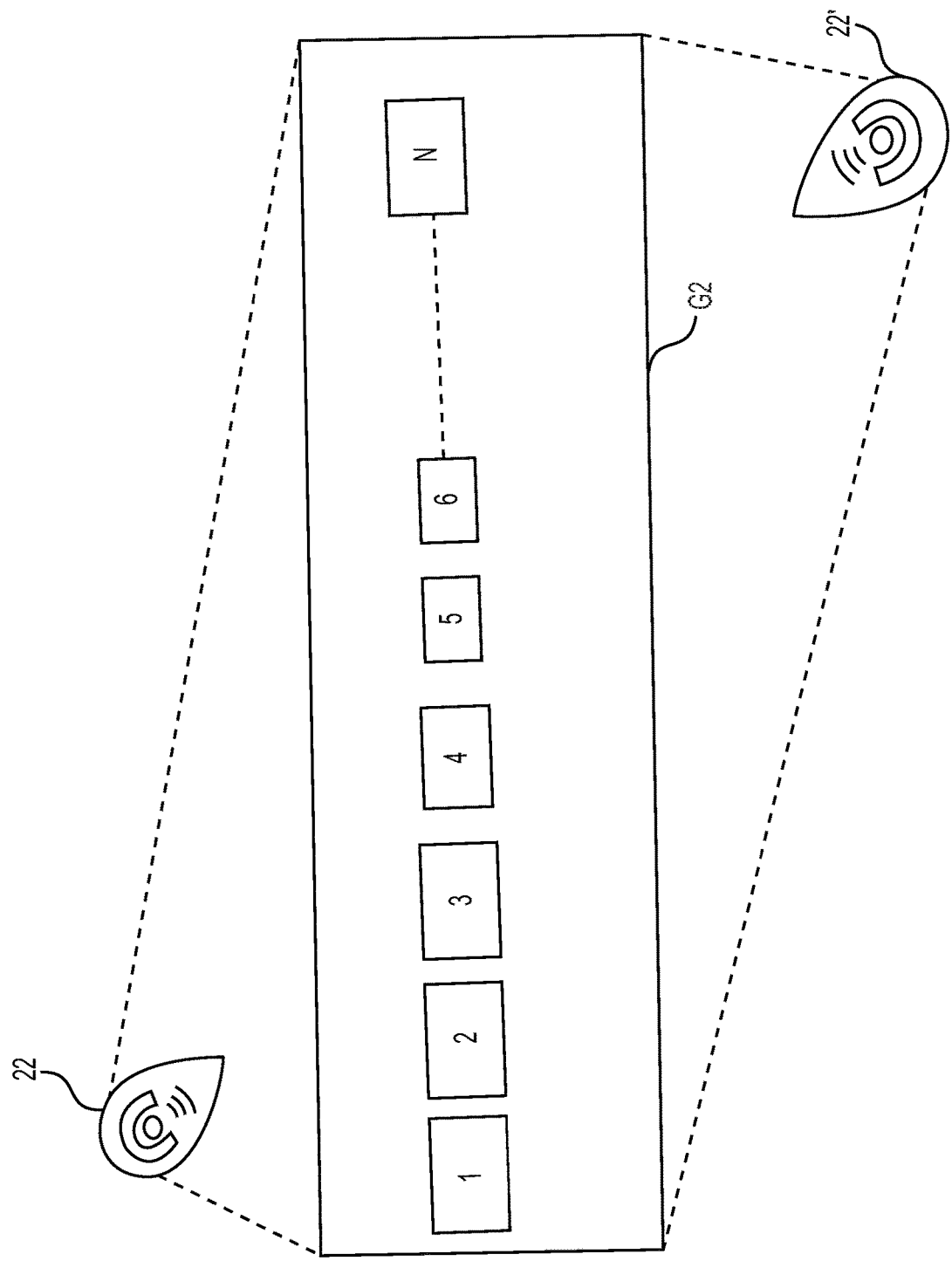
FIG. 7 is a schematic illustration of a storage of an exemplary key fob.

FIG. 1 illustrates an exemplary key fob duplication device 10. In one exemplary embodiment as illustrated in FIG. 1, duplication device 10 may be a portable and/or handheld device. It is contemplated, however, that some or all components of duplication device 10 may be incorporated in, for example, a kiosk, for example, a key cutting kiosk that may be located in a commercial or retail location such as at a grocery or hardware store, shopping mall, or airport. Duplication device 10 may be configured to duplicate key fob 22 (see FIG. 7). Key fob 22 may be a device that may include data, which may be used to provide access to other electronic devices such as computer systems, mobile phones, etc., facilities such as office buildings, apartments etc., high security locations, closets, etc. The shape of key fob 22 illustrated in FIG. 7 is exemplary and it is contemplated that key fob 22 may have any other shape. It is to be understood that the term key fob includes wireless tags, RFID tags, or other devices that store data that may be used to provide access to facilities, electronic devices, and/or networks and services.

Duplication device 10 may include housing 12, display 14, receptacle 16, antenna 18, and power switch 20. In one exemplary embodiment, housing 12 may be made of overmolded soft touch materials. Housing 12 may enclose various components associated with duplication device 10. For example, as illustrated in the exemplary embodiment of FIG. 2, housing 12 may include upper housing 30 and lower housing 32, which together may enclose display 14 and circuit board 36. Upper housing 30 may include tray portion 40 and display portion 42, which may include upper surface 44 and side walls 46, 48. Upper surface 44 and side walls 46, 48 may define a recess 50 configured to receive display 14, lower housing 32, and circuit board 36.

Tray portion 40 may include receptacle 16 that may be formed as a recess in upper surface 44. Receptacle 16 may be configured to receive key fob 22. For example, during operation of duplication device 10, key fob 22 may be placed in receptacle 16 or may be positioned adjacent to receptacle 16. It is also contemplated that in some exemplary embodiments, tray portion 40 may include one or more input devices configured to receive inputs from a user of duplication device 10. For example, input devices may include one or more physical keyboards, mice, joysticks, buttons, touch pads, etc. It is also contemplated that in some exemplary embodiments, the input devices may be configured to receive a speech input or braille input from a user. In one exemplary embodiment, tray portion 40 may be disposed generally horizontally and may be positioned generally parallel to a table top or other surface supporting duplication device 10. Display portion 42 may be disposed at an angle relative to tray portion 40. Display portion 42 may include an opening 52 configured to receive display 14.

Display 14 may include a conventional display device, for example, an LCD screen, an LED screen, etc. Display 14 may be configured to display a graphical user interface, including instructions, advertising, and/or other information. In some exemplary embodiments, display 14 may additionally or alternatively include a touch screen device configured to receive one or more inputs from a user. For example, display 14 may be configured to display a virtual keyboard or numeric keypad, which may allow a user to enter payment information, address information, identification information, and/or other information associated with duplicating one or more key fobs using key fob duplication device 10.

Figure 2:
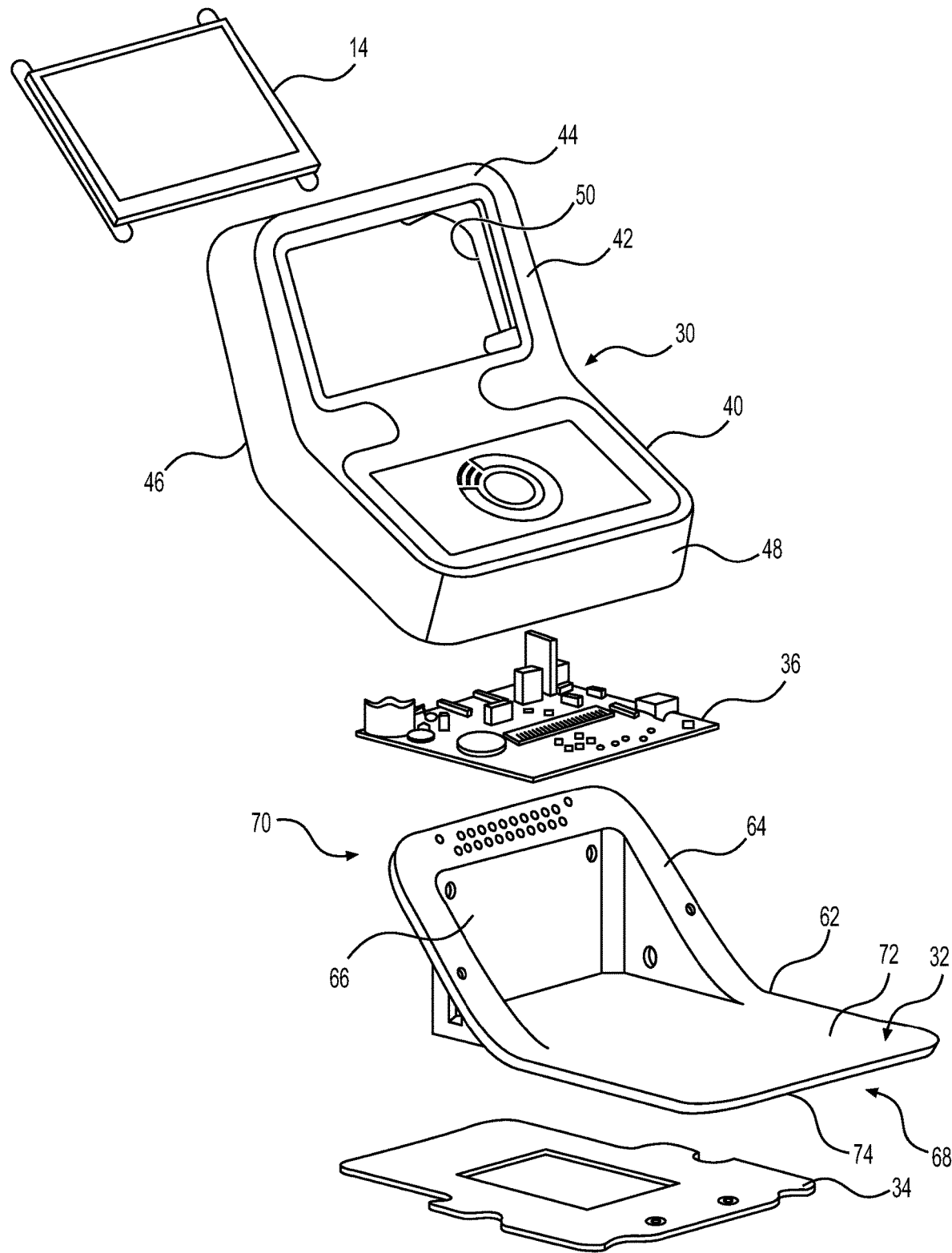
FIG. 2 is an exploded view illustration of portions of the duplication device of FIG. 1.

Lower housing 32 may include base 62, frame 64, and rear wall 66. Base 62 may be in the form of a generally flat plate that may extend from adjacent front end 68 to adjacent rear end 70 of duplication device 10. Base 62 may include one or more fasteners (not shown) that may engage with corresponding openings in upper housing 30 to attach upper housing 30 with lower housing 32. Lower housing 32 may also include frame 64 that may extend from upper surface 72 of base 60 towards rear end 70. Frame 64 may be connected to base 62 at the location disposed between front end 68 and rear end 70. In one exemplary embodiment as illustrated in FIG. 2, frame 64 may be an integral portion of base 62. Frame 64 may be disposed inclined relative to base 60 and may be configured to support display 14 at an angle relative to tray portion 40 of upper housing 30. Rear wall 66 may extend from frame 64 toward base 60 adjacent rear end 70 of duplication device 10. Rear wall 66 may be connected to frame 64 and base 60.

Foot pad 34 may be attached to lower surface 74 of base 60. Foot pad 34 may be made of a soft material, for example, silicon rubber that may provide a cushioning surface between duplication device 10 and a surface supporting duplication device 10. Circuit board 36 may be positioned within recess 50 between upper housing 30 and lower housing 32. Exemplary components of circuit board 36 will be discussed in detail below.

Figure 3:
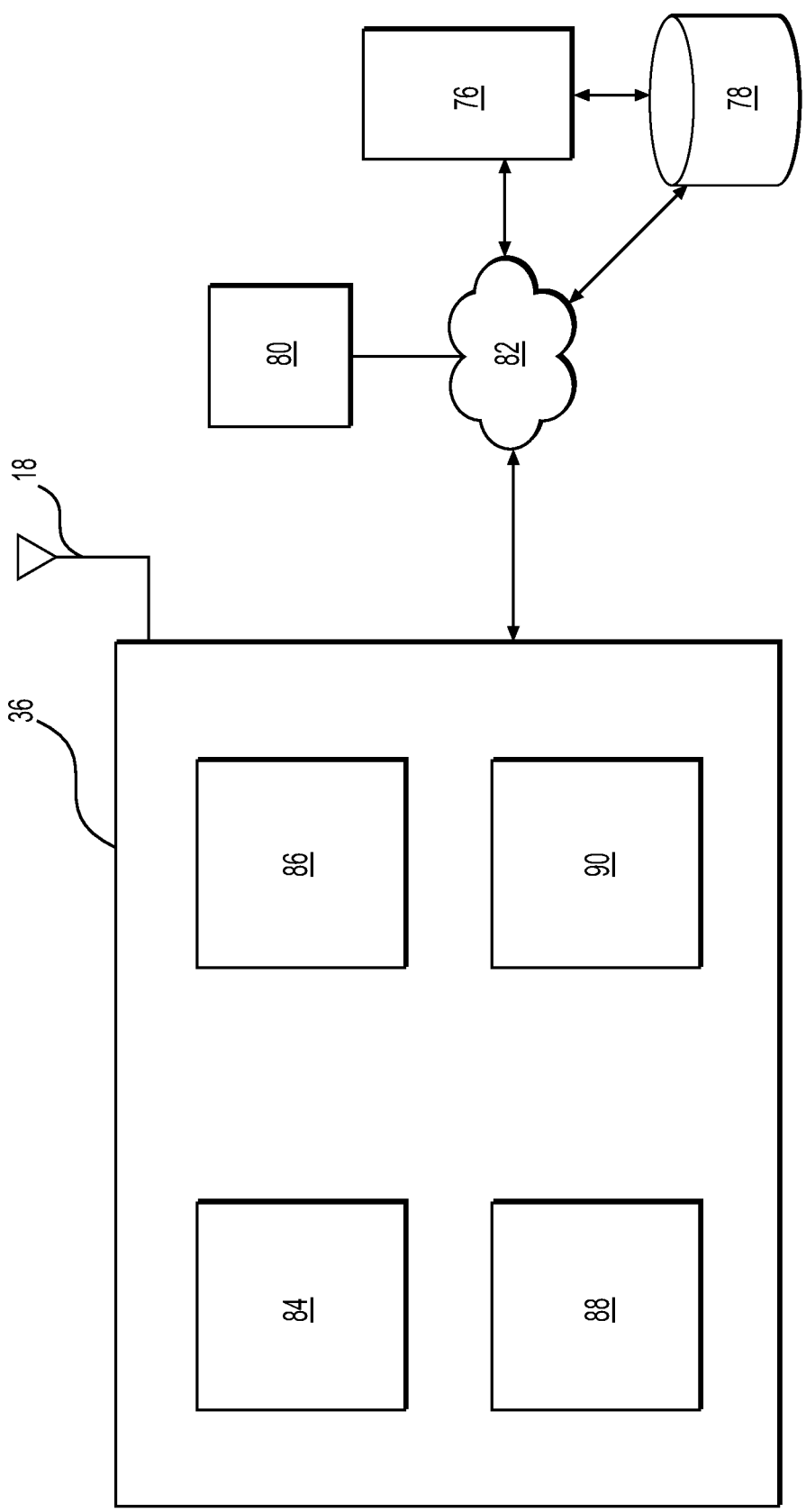
FIG. 3 is a schematic illustrating various components of an exemplary circuit board of the duplication device of FIG. 1.

Returning to FIG. 1, duplication device 10 may include one or more antennae 18 configured to allow communication between duplication device 10 and server 76 (see FIG. 3). The one or more antennae 18 may be removably connected to housing 12 and may be foldable and/or rotatable for convenient storage of duplication device 10. As also illustrated in FIG. 1, duplication device 10 may include a power switch 20 configured to turn duplication device 10 on or off. Although power switch 20 has been illustrated as being located on one side of duplication device 10, it is contemplated that power switch 20 may be located anywhere on duplication device 10. Further, power switch 20 may be in the form of a button, a toggle switch, or any other type of electrical device configured to provide or interrupt electrical power to duplication device 10. In other words, power switch 20 may be configured to turn duplication device 10 one or off. Duplication device 10 may include a battery (not shown) that may provide electrical power for operation of duplication device 10. Additionally or alternatively duplication device 10 may include a power cord that may allow duplication device 10 to receive electrical power from a wall outlet.

FIG. 3 is a schematic illustration of circuit board 36. As illustrated in the exemplary embodiment of FIG. 3, circuit board 36 and, therefore, duplication device 10 may be configured to exchange data and/or instructions with, for example, server 76, database 78, and/or user device 80 via network 82. Circuit board 36 may include a controller (or processor) 84, memory 86, radio frequency circuits 88, and transceiver 90. Although only a few components of the circuit board have been identified, it is contemplated that circuit board 36 may include other electronic components that may assist controller 84 in reading data stored on a key fob 22 (see FIG. 7) and writing data to a blank key fob 22' (see FIG. 7). Although not illustrated in FIG. 3, controller 84, memory 86, radio frequency circuits 88, transceiver 90, and other components of circuit board 36 may be electrically connected to each other.

Controller 84 may embody a single microprocessor or multiple microprocessors, digital signal processors (DSPs), field-programmable gate array (FPGA) devices, etc. Numerous commercially available microprocessors may be configured to perform the processor functions. Various other known circuits may be associated with the processor, including power supply circuitry, signal-conditioning circuitry, and communication circuitry. Controller 84 may be configured to control operations of one or more input devices associated with duplication device 10, display 14, memory 86, radio frequency circuits 88, and/or transceiver 90. Controller 84 may be configured to perform various operations, including for example, reading key fob 22, decrypting encrypted data stored on key fob 22, writing the encrypted or unencrypted data obtained from key fob 22 in encrypted or unencrypted form to a blank key fob 22', exchanging data, instructions, and/or communications with one or more of server 76, database 78, and/or user device 80, etc.

Memory 86 associated with controller 84 may store, for example, data and/or one or more control routines or instructions for processing the one or more signals received from display 14, antennae 18, radio frequency circuits 88, and/or transceiver 90, and/or to control operations of one or more other components of duplication device 10. Memory 86 may embody non-transitory computer-readable media, for example, Random Access Memory (RAM) devices, NOR or NAND flash memory devices, and Read Only Memory (ROM) devices, CD-ROMs, hard disks, floppy drives, optical media, solid state storage media, etc. Controller 84 may receive one or more input signals from one or more of display 14 or other input devices associated with duplication device 10 and may execute the routines or instructions stored in memory 86 to generate and deliver one or more command signals to one or more components of duplication device 10.

Radio frequency circuits 88 may be configured to generate an electromagnetic field having a low frequency ranging between 125-134 kHz or a high frequency of about 13.56 MHz. Radio frequency circuits 88 may include separate circuits for generating the low and high frequencies. Radio frequency circuits 88 may also include separate RFID antennae that may emit the respective low or high frequency electromagnetic field. Key fob 22 when placed on or adjacent to receptacle 16 may receive the electromagnetic field generated by the radio frequency circuits 88 of key fob duplication device 10. In response, key fob 22 may transmit data stored on key fob 22 to key fob duplication device 10, which may receive the data via antennae 18 and transceiver 90. Similarly, when duplication device 10 writes to blank key fob 22', the data to be written to blank key fob 22' may be transmitted to key fob 22' via one or more of transceiver 90 and antennae 18. Controller 84 may also transmit a signal to key fob 22' causing key fob 22' to store the data received by key fob 22' in storage 92 (see FIG. 7) associated with key fob 22'.

Transceiver 90 may be connected to the one or more antennae 18 and may be configured to send data or instructions to server 76, database 78, and/or user device 80 wirelessly or through a wired connection via network 82. For example, controller 84 may be configured to send to or receive from server 76, database 78, and/or user device 80, stored data associated with key fob 22 and/or identification information associated with a user. As will be described in detail below, additionally or alternatively, controller 84 may be configured to receive instructions and/or encryption key information from server 76 or database 78 via network 82.

Server 76 may include one or more computational devices that may include a general-purpose computer, a mainframe computer, or any combination of these components. In certain embodiments, server 76 may be standalone, or it may be part of a subsystem, which may be part of a larger system. For example, server 76 may represent distributed servers that are remotely located and communicate over network 82. In addition, consistent with the disclosed embodiments, server 76 may be implemented as a server, a server system comprising a plurality of servers, or a server farm comprising a load balancing system and a plurality of servers. Server 76 may include controllers/processors, memory, and/or transceivers that may have a structure and function similar to controller 84, memory 86, and/or transceiver 90, respectively.

User device 80 may include one or more computational devices associated with a user. By way of example, user device 80 may include computational devices such as personal computers, laptop computers, desktop computers, tablet computers, notebooks, mobile phones, smart watches, other smart devices, etc. User device 80 may be configured to execute an application or a set of instructions to send or receive data and/or instructions from duplication device 10, server 76, and/or database 78. User device 80 may include controllers/processors, memory, and/or transceivers that may have a structure and function similar to controller 84, memory 86, and/or transceiver 90, respectively.

Network 82 may facilitate electronic communication and exchange of data and/or information between duplication device 10, server 76, and/or database 78. Network 82 may include any combination of communication networks and may include wired and/or wireless networks. For example, network 82 may include the Internet and/or another type of wide area network, an intranet, a metropolitan area network, a local area network, a wireless network, a cellular communications network, etc.

Figure 4:
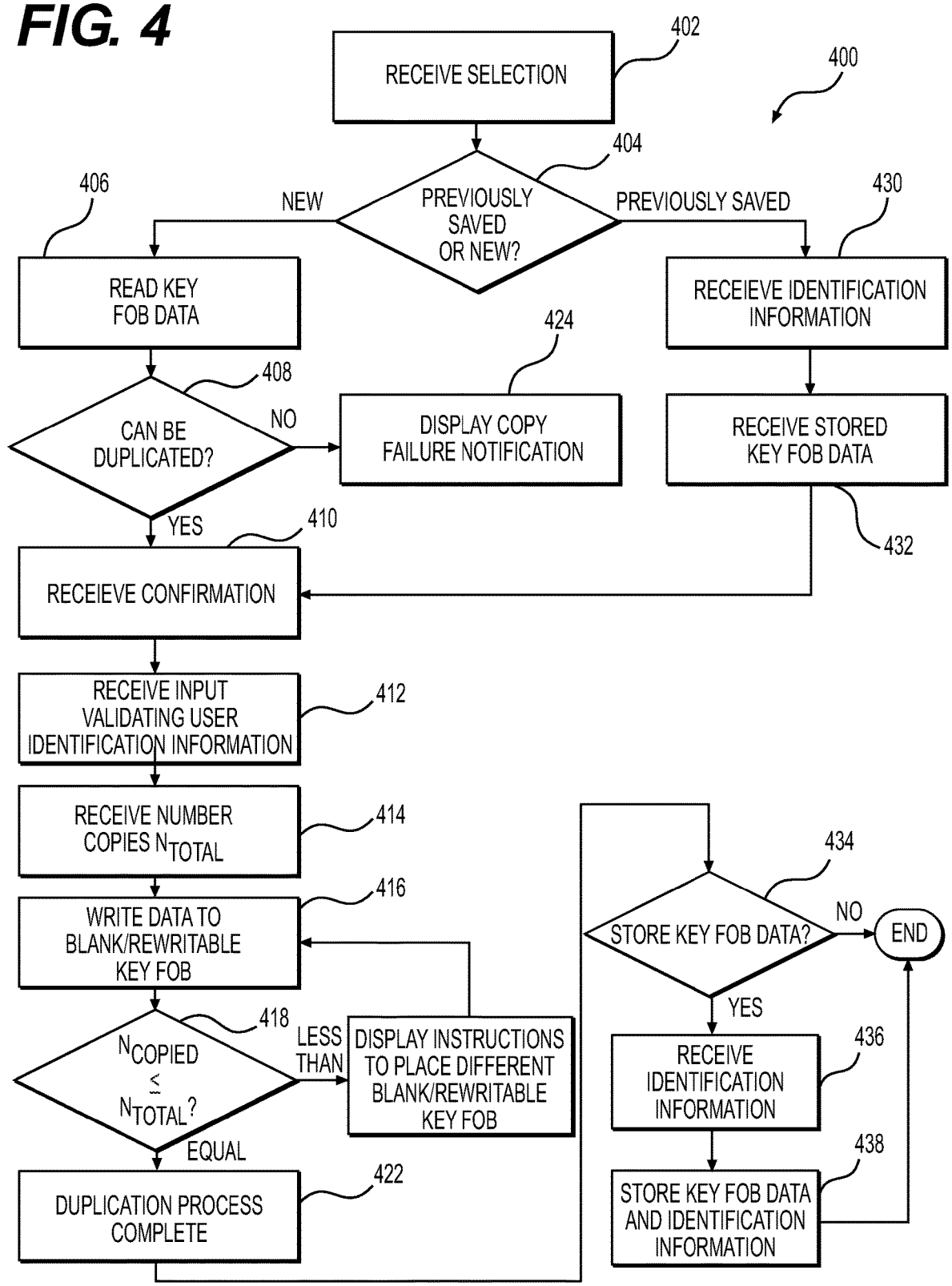
FIG. 4 is a flow chart of an exemplary method performed by the duplication device of FIG. 1.

FIG. 4 illustrates an exemplary method 400 that may be performed by duplication device 10. For example, duplication device 10 may perform method 400 for duplicating key fob 22 by copying the data stored on key fob 22 to a blank key fob 22'. It is also contemplated that in some exemplary embodiments, key fob 22' may not be a blank key fob but instead may include a rewritable key fob. The order and arrangement of steps of method 400 is provided for purposes of illustration. As will be appreciated from this disclosure, modifications may be made to method 400 by, for example, adding, combining, removing, and/or rearranging the steps of method 400. Method 400 may be executed by controller 84 together with various other components of duplication device 10, server 76, and/or database 78.

Method 400 may include a step of receiving a selection from a user (Step 402). In operation, a user (e.g. customer or store associate) may initiate an interaction with duplication device 10 by, for example, pressing a "start" or "new order" button displayed on, for example, a touch-screen display 14, or by touching the touch-screen display 14. Display 14 may send a signal to controller 84 indicating pressing of the "start" or "new order" or detection of a touch on display 14. In response, controller 84 may provide additional instructions to the user via display 14, for example, requesting the user to select whether the user wants to duplicate a previously stored key fob 22 or a new key fob 22. Controller 84 may also cause display 14 to display one or more graphical icons or widgets that may be activated by the user via touch screen display 14 and/or one or more input devices associated with duplication device 10 to make the selection. Controller 84 may monitor touchscreen display 14 and/or the other input devices associated with duplication device 10 to receive a signal indicating the user selection.

Method 400 may include a step of determining whether the user has selected previously stored key fob 22 or new key fob 22 for duplication (Step 404). When controller 84 determines that the user has selected new key fob 22 for duplication (Step 404: New), controller 84 may proceed to step 406. When controller 84 determines, however, that the user has selected a previously saved key fob 22 for duplication (Step 404: Previously Saved), controller 84 may proceed to step 430.

In step 406, controller 84 may provide instructions to the user via display 14 to place key fob 22 on or adjacent to receptacle 16. Controller 84 may monitor signals received by transceiver 90 to determine whether user has placed key fob 22 on or adjacent to receptacle 16. As described above, when key fob 22 is placed on or adjacent to receptacle 16, key fob 22 may receive a low-frequency or high-frequency electromagnetic filed emitted by duplication device 10. The electromagnetic field may activate key fob 22, and upon activation, key fob 22 may transmit a signal to transceiver 90. When controller 84 detects that key fob 22 has been placed on or adjacent to receptacle 16, controller 84 may read data stored on key fob 22. As will be described with respect to FIG. 5 below, controller 84 may execute method 500 to read the data stored on key fob 22.

Method 400 may include a step of determining whether key fob 22 can be duplicated (Step: 408). Controller 84 may make this determination based on the data stored in key fob 22. For example, as illustrated in FIG. 7, each of key fobs 22 and 22' may include a plurality of sectors, blocks, or locations for storing data associated with a respective key fob 22, 22'. Here key fob 22 represents a key fob which is being duplicated and key fob 22' represents a blank/rewritable key fob on which duplication device 10 will write the data obtained from key fob 22. As illustrated in FIG. 7, key fob 22 or blank/rewritable key fob 22' may each include blocks 1 to N (where N is an integer). Data associated with key fob 22 or 22' may be stored in the one or more of blocks 1 to N. It is contemplated that N may be any number. For example, high-frequency key fobs may include 16 sectors, each including 4 blocks, for a total of 64 blocks. It is also contemplated that in some exemplary embodiments, a password may be stored in, for example, the seventh block. In such cases, for example, byte 28 of block 0 may have the value 1, and the password may be used to protect the data stored on the key fob. The password may also be stored in memory 86 and/or database 78. In step 408, controller 84 may determine whether a predetermined block includes an indicator value configured to indicate whether key fob 22 may be duplicated. In one exemplary embodiment, the predetermined block may be the seventh block of the N blocks. In another exemplary embodiment, the predetermined block may be the fifth block or the sixth block of the N blocks. It is contemplated, however, that the predetermined block may be any selected one of the N blocks.

Controller 84 may determine whether key fob 22 may be duplicated in many ways. In one exemplary embodiment, the determination may be based on whether the predetermined block includes any data. Thus, for example, controller 84 may determine that key fob 22 is not an original key fob and cannot be duplicated when the predetermined block (e.g. the seventh block) includes some data (e.g. any value). Conversely, controller 84 may determine that key fob 22 is an original key fob and can be duplicated when the predetermined block (e.g. the seventh block) does not include any data (e.g. it is blank, empty, or includes data different from that assigned to it previously). In another exemplary embodiment, controller may compare the data stored in the predetermined block with predetermined data (e.g. a predetermined indicator value). Controller 84 may determine that key fob 22 is not an original key fob and cannot be duplicated when the data stored in the predetermined block matches the predetermined indicator value. Conversely, controller 84 may determine that key fob 22 is an original key fob and can be duplicated when the data stored in the predetermined block does not match the predetermined indicator value. In yet another exemplary embodiment, controller 84 may retrieve stored indicator values from server 76 and/or database 78. Controller 84 may then compare the data stored in the predetermined block with the stored indicator values. Controller 84 may determine that key fob 22 is not an original key fob and cannot be duplicated when the data stored in the predetermined block matches at least one of the stored indicator values. Conversely, controller 84 may determine that key fob 22 is an original key fob and can be duplicated when the data stored in a predetermined block does not match any of the stored indicator values. It is contemplated that the indicator value may be a value (e.g. number or text) or may include any other type of information, data, or indication that may indicate to a user and/or controller 84 of duplication device 10 that key fob 22 and/or key fob 22' cannot be duplicated. In yet other exemplary embodiments, controller 84 may generate a hash value based on the data stored in key fob 22 and/or key fob 22'. Controller 84 may compare the generated hash value with a hash value stored in, for example, memory 86 and/or database 78. When the hash value generated by controller 84 matches the hash value stored in memory 86 and/or database 78, controller 84 may determine that key fob 22 is an original key fob and can be duplicated. Conversely, when the hash value generated by controller 84 does not match the hash value stored in memory 86 and/or database 78, controller 84 may determine that key fob 22 is not an original key fob and cannot be duplicated.

Returning to FIG. 4, when controller 84 determines that key fob 22 can be duplicated (Step 408: Yes), controller 84 may proceed to step 410. When controller 84 determines, however, that key fob 22 cannot be duplicated (Step 408: No), controller 84 may proceed to step 424. In step 424, controller 84 may display a copy failure notification on display 14, indicating that key fob 22 is not an original key fob and cannot be duplicated. Controller may end method 400 after displaying the copy failure notification.

Method 400 may include a step of receiving confirmation from a user (Step 410). For example, in step 410, controller 84 may provide instructions to a user via display 14 to provide an identifier of a user device. In one exemplary embodiment, the identifier may include a phone number or IP address associated with user device 80. Controller 84 may display a virtual keyboard or numeric keypad on touchscreen display 14 to enable a user to enter the identifier for user device 80. Controller 84 may receive the identifier provided by the user via touchscreen display 14 or via one or more input devices associated with duplication device 10. After receiving the identifier for user device 80, controller 84 may transmit a notification to user device 80. In one exemplary embodiment, the notification may be a text message requesting the user to confirm that the user is the owner of key fob 22 and/or is legally allowed to make copies of key fob 22. It is contemplated that the notification may be additionally or alternatively sent via other types of electronic communication, for example, electronic mail, a voicemail, or a phone call. The notification may require the user to respond by providing identification information, which may include, for example, the user's name, initials, signature, etc. It is also contemplated that the user may provide the identification information by responding to a voicemail or phone call. Controller 84 may monitor signals received by transceiver 90 to determine whether the identification information has been received from user device 80.

Method 400 may include a step of receiving an input validating the user identification information (Step 412). In one exemplary embodiment, upon receiving the user identification information from user device 80, controller 84 may display instructions on display 14, requesting a store associate, different from the user, to validate the user identification information. Controller 84 may also display a checkbox, button, or other graphical user interface widget on display 14 and monitor signals from display 14 to determine whether the checkbox, button, or widget has been activated. A store associate may validate the user identification information provided by the user (e.g. name, initials) by comparing the identification information with physical identification provided by the user (e.g. driver's license, identification card). When the information on the physical identification matches the identification information provided by the user, the store associate may activate the checkbox, button, or widget on display 14. In another exemplary embodiment, after validating the user identification information, the store associate may enter a predetermined input (e.g. a predetermined code, password, etc.) via touch screen display 14 and/or the one or more input devices associated with duplication device 10. In response to activation of one or more of the checkbox, button, or widget, or receipt of the predetermined input, controller 84 may proceed to step 414.

Method 400 may include a step of receiving a number of copies $N_{Total}$ of key fob 22 that the user wishes to make (Step 414). In step 414, controller 84 may display instructions on display 14, requesting the user to enter the number of copies $N_{Total}$ of key fob 22 desired by the user. In one exemplary embodiment, controller 84 may display a virtual keyboard or numeric keypad, which may allow a user to enter the number of copies desired. In another exemplary embodiment, a user may enter the number of copies using one or more input devices associated with duplication device 10. In yet another exemplary embodiment, controller 84 may be configured to transmit the instructions to user device 80, which in turn may display the instructions on user device 80. In this case, the user may enter the desired number of copies via user device 80, which may transmit the user input to controller 84.

Method 400 may include a step of writing data associated with key fob 22 onto blank/rewritable key fob 22' (Step 416). In step 416, controller 84 may display instructions on display 14, requesting the user to remove key fob 22 and instead place blank or rewritable key fob 22' on or adjacent to receptacle 16. Controller 84 may perform processes similar to those discussed above with respect to, for example, step 406 to detect whether blank or rewritable key fob 22' has been placed on or adjacent to receptacle 16. When controller 84 detects that blank or rewritable key fob 22' has been placed on or adjacent to receptacle 16, controller 84 may transmit the data of key fob 22 to key fob 22' and provide a signal to key fob 22' causing the transmitted data to be written in storage 92 of key fob 22'. As will be described with respect to FIG. 6 below, controller 84 may execute method 600 to write the data onto key fob 22'.

Method 400 may include a step of determining whether the number of key fobs 22' copied $N_{Copied}$ is less than or equal to the desired number $N_{Total}$ (Step 418). When controller 84 determines that the number of key fobs 22' copied $N_{Copied}$ is less than $N_{Total}$ (Step 416: Less Than), controller 84 may proceed to step 420. In step 420, controller 84 may display instructions on display 14, requesting the user to place a different blank or rewritable key fob 22' on or adjacent to receptacle 16. Controller 84 may perform processes similar to those discussed above with respect to, for example, step 406 to detect whether a blank or rewritable key fob 22' has been placed on or adjacent to receptacle 16. When controller 84 detects that blank or rewritable key fob 22' has been placed on or adjacent to receptacle 16, controller 84 may proceed to step 416.

Returning to step 418, when controller 84 determines that the number of key fobs 22' copied, $N_{Copied}$, is equal to $N_{Total}$ (Step 418: Equal), controller 84 may proceed to step 422. In step 422, controller 84 may display a notification on display 14 indicating that the key fob duplication process is complete and end method 400.

Returning to step 404, when controller 84 determines that the user has elected to duplicate a previously saved key fob 22 (Step 404: Previously Saved), controller 84 may proceed to step 430 of receiving identification information from the user. In step 430, controller 84 may display instructions on display 14, requesting the user to provide identification information associated with the saved key fob data. In one exemplary embodiment, the identification information may include a phone number or other identifier, for example, a PIN or code associated with the user. In another exemplary embodiment, the identification information may include a username and password. In step 424, controller 84 may display a virtual keyboard and/or numeric key pad to allow the user to enter the identification information. It is also contemplated that in some exemplary embodiments controller may receive the identification information via the one or more input devices associated with duplication device 10. It is further contemplated that in some exemplary embodiments, controller 84 may transmit a notification to user device 80, requesting the user to provide the identification information. A user may enter the identification information on user device 80 and transmit the identification information to controller 84. Alternatively, the user may transmit identification information previously stored on user device 80 to controller 84. Controller 84 may receive the identification information transmitted by user device 80 via one of more of transceiver 90 and antennae 18.

Method 400 may include a step of receiving the stored key fob data (Step 432). In step 432, controller 84 may transmit the identification information received, for example, in step 430 to server 76 and/or database 78 via network 82. Server 76 may retrieve the stored key fob data associated with the identification information, for example, from database 78 and transmit the stored key fob data to duplication device 10 via network 82. Controller 84 may receive the stored key fob data and proceed to step 410. Controller 84 may then repeat steps 410 through 422 to write key fobs 22'.

In some exemplary embodiments, method 400 may also allow a user to store the data from key fob 22 for subsequent use. In these embodiments, method 400 may include a step of determining whether the user desires to store key fob data obtained from key fob 22 (Step 434). It is also contemplated that in some exemplary embodiments, controller 84 may transmit, for example, a hyperlink to user device 80. The hyperlink may allow a user to access a web page or application that may help the user store the data for a key fob and/or manage any key fob data previously stored by the user. In other exemplary embodiments, in step 434, controller 84 may display instructions on display 14, requesting the user to indicate whether the user would like to store the data obtained, for example in step 510, from key fob 22. Regardless of whether controller 84 displays instructions on display 14 or the user accesses a hyperlink, method 400 may perform steps 434 through 438 as explained below. Thus, for example, controller 84 may display a virtual keyboard, numeric key pad or other graphical icon on display 14 to enable the user to respond to the instructions. For example, controller 84 may display a "Yes" button or icon corresponding to a user's selection to store the key fob data and a "No" button or icon corresponding to a user's selection not to store the key fob data. Controller 84 may monitor signals received from display 14 and/or the one or more input devices associated with duplication device 10 to determine, for example, whether the user has activated the "Yes" or "No" button or icon. Similar icons may be displayed on the web page accessed by a user via the hyperlink transmitted to user device 80. When controller 84 determines that the user wishes to store the data obtained from key fob 22 (e.g. user activates the Yes icon) (Step 434: Yes), controller 84 may proceed to step 436. When controller 84 determines, however, that the user does not wish to store the data obtained from key fob 22 (e.g. user activates the No icon) (Step 434: No), controller 84 may end method 400.

Method 400 may include a step of receiving identification information from the user (Step 436). In step 436, controller 84 may execute processes similar to those discussed above, for example, with respect to step 430 of method 400. Method 400 may include a step of storing data of key fob 22 in association with the identification information provided by the user (Step 438). In step 438, controller 84 may transmit the identification information and the data obtained from key fob 22 to server 76. Server 76 may be configured to store the identification information in association with the data from key fob 22 in database 78. After executing step 438, controller 84 may end method 400.

Figure 5:
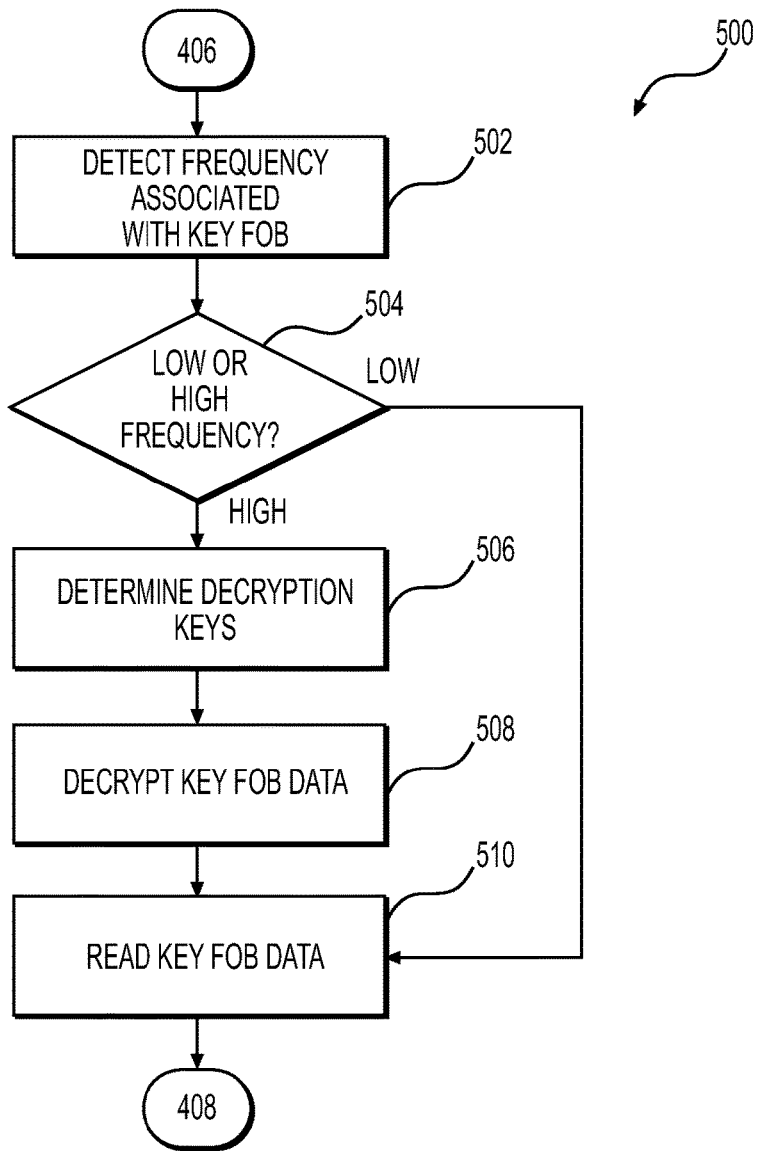
FIG. 5 is a flow chart of a exemplary method performed by the duplication device of FIG. 1 for reading data stored on a key fob.

FIG. 5 illustrates an exemplary method 500 that may be performed by duplication device 10 for reading the data from key fob 22 or 22'. The order and arrangement of steps of method 500 is provided for purposes of illustration. As will be appreciated from this disclosure, modifications may be made to method 500 by, for example, adding, combining, removing, and/or rearranging the steps of method 500. Method 500 may be executed by controller 84 together with various other components of duplication device 10, server 76, database 78, and/or user device 80. As also discussed above, controller 84 may perform some or all the steps of method 500 when performing step 406 of method 400.

Method 500 may include a step of detecting a frequency associated with key fob 22 (Step 502). As discussed above, key fobs 22, 22' may be designed for low frequency (e.g. 125-134 kHz) activation or high-frequency (e.g. 13.56 MHz) activation. As also discussed above, radio frequency circuits 88 of duplication device 10 may be configured to generate an electromagnetic field having a low frequency or a high frequency. In step 502, controller 84 may control radio frequency circuits 88 to generate an electromagnetic field having low frequency (e.g. 125-134 kHz). Controller 84 may also monitor transceiver 90 to detect receipt of any signals from key fob 22 in response to generating the electromagnetic field of low frequency. When controller 84 detects signals received from key fob 22 via transceiver 90 in response to a low-frequency electromagnetic field, controller 84 may determine that key fob 22 is a low-frequency fob. When controller 84 does not detect signals received from key fob 22 in response to a low-frequency electromagnetic field, controller 84 may control radio frequency circuits 88 to generate a high-frequency electromagnetic field. When controller 84 detects signals received from key fob 22 via transceiver 90 in response to a high-frequency electromagnetic field, controller 84 may determine that key fob 22 is a high-frequency fob.

Method 500 may include a step of determining whether key fob 22 is a low- or high-frequency fob (Step 504). When controller 84 determines that key fob 22 is a low-frequency fob (Step 504: Low), controller 84 may proceed to step 510. RFID key fobs associated with low frequency typically do not contain encrypted data. Therefore, when controller 84 determines that key fob 22 is a low-frequency key fob (Step 504: Low), controller 84 may proceed to step 510 of reading the data stored on key fob 22. For example, in step 510, controller 84 may read data stored in one or more of the 1-N blocks of key fob 22.

Returning to step 504, RFID key fobs associated with high frequency typically include encrypted data. Thus, when controller 84 determines that key fob 22 is a high-frequency key fob (Step 504: High), controller 84 may proceed to step 506 of determining decryption keys for each of blocks 1-N of key fob 22. In step 506, controller 84 may retrieve a set of known decryption keys from memory 86, server 76, and/or database 78. Controller 84 may apply decryption keys from the set of known keys to the encrypted data stored in blocks 1-N (or sectors 0-16, for example) to identify decryption keys capable of decrypting the data stored in each of blocks 1-N of key fob 22. In some cases, the set of known decryption keys may not include all the decryption keys corresponding to all of the N blocks. For example, out of the N blocks, the set of known decryption keys may include decryption keys corresponding to only M blocks (M<N). In this case, controller 84 may use other known techniques, such as, brute force attacks, or nested authentication to identify decryption keys for the remaining N-M blocks. In one exemplary embodiment, controller 84 may apply one or more techniques for determining encrypted keys disclosed in, for example, "Card-Only Attacks on MiFare Classic," Nicolas T. Courtois, RFIDSec, 2009 (available at https://www.cosic.esat.kuleuven.be/rfidsec09/Papers/mifare_courtois_rfidsec09.pdf), the entire content of which is incorporated herein. It is also contemplated that controller 84 may employ one or more other well-known techniques for determining the unknown encryption keys for the remaining N-M blocks. It is also contemplated that in some cases, all the decryption keys for the 1-N blocks (or 0-16 sectors, for example) may be already included in the set of decryption keys received by controller 84 from memory 86, server 76, and/or database 78. In this case, controller 84 may not need to perform step 506 and may directly proceed to step 508.

Method 500 may include a step of decrypting the data stored in blocks 1-N (Step 508). In step 506, controller 84 may use the decryption keys identified for blocks 1-N in, for example, step 508 to decrypt the encrypted data stored in blocks 1-N of key fob 22. Method 500 may then proceed to step 510 of reading the data in blocks 1-N of key fob 22. It is also contemplated that in some exemplary embodiments steps 508 and 510 may be combined or performed simultaneously. Method 500 may then proceed to step 408 of method 400.

Figure 6:
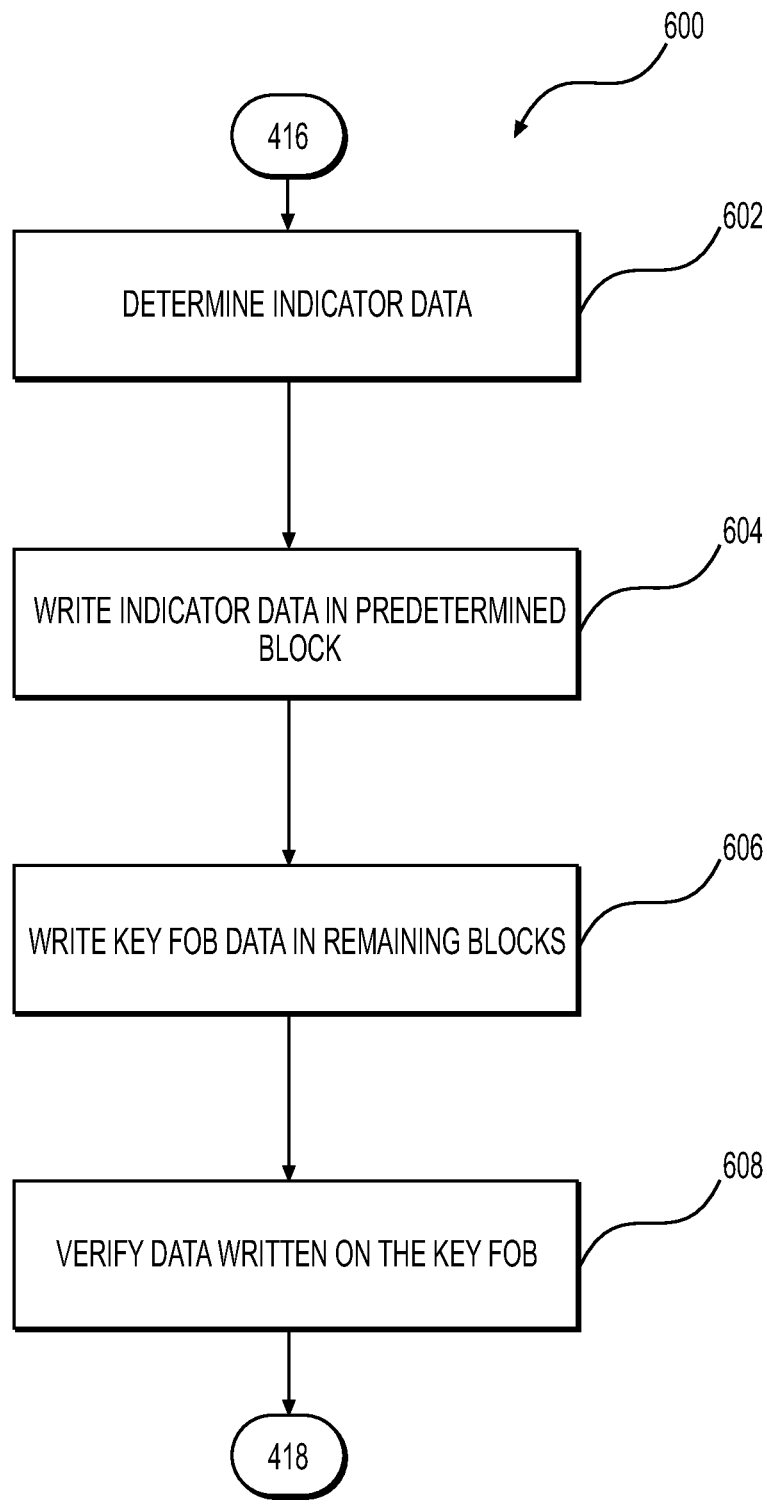
FIG. 6 is a flow chart of a exemplary method performed by the duplication device of FIG. 1 for writing data to a blank key fob.

FIG. 6 illustrates an exemplary method 600 that may be performed by duplication device 10 for writing the data from key fob 22 onto key fob 22'. The order and arrangement of steps of method 600 is provided for purposes of illustration. As will be appreciated from this disclosure, modifications may be made to method 600 by, for example, adding, combining, removing, and/or rearranging the steps of method 600. Method 600 may be executed by controller 84 together with various other components of duplication device 10, server 76, database 78, and/or user device 80. As also discussed above, controller 84 may perform some or all the steps of method 600 when performing step 414 of method 400.

Method 600 may include a step of determining indicator data, including, for example, an indicator value (Step 602). In step 602, controller 84 may generate a random number seed. Controller 84 may also generate the indicator value based on the random number seed. In one exemplary embodiment, the indicator value may take the value of the random number seed. It is contemplated, however, that in other exemplary embodiments, controller 84 may perform one or more mathematical operations or execute one or more mathematical algorithms using the random number seed to generate the indicator value. It is also contemplated that in some exemplary embodiments, controller 84 may transmit the indicator value to server 76, which may be configured to store the indicator value in database 78. It is further contemplated that in some exemplary embodiments, the indicator value may be a predetermined value and controller 84 may retrieve the predetermined indicator value from memory 86, server 76, and/or database 78.

Method 600 may include a step of writing the indicator data in the predetermined block (Step 604). For example, controller 84 may select the predetermined block, which may be the seventh of the N blocks of data associated with key fob 22'. In step 604, controller 84 may write the indicator value generated in, for example, step 602 in the predetermined block of key fob 22'. The indicator value written in the predetermined block may be encrypted or unencrypted. For example, when controller 84 determines that key fob 22 is a low-frequency fob (see e.g. Step 504 of Method 500), controller 84 may write the indicator value in the predetermined block without encrypting the indicator value. In other exemplary embodiments, when controller 84 determines that key fob 22 is a high-frequency fob (see e.g. Step 504 of Method 500), controller 84 may encrypt the indicator value using the decryption key corresponding to the predetermined block. Controller 84 may then write the encrypted indicator value in the predetermined block. It is contemplated, however, that in some exemplary embodiments, controller 84 may write an unencrypted indicator value in the predetermined block of key fob 22' even though key fob 22 may be a high-frequency fob.

Method 600 may include a step of writing data obtained from key fob 22 in the remaining blocks of key fob 22'. For example, when the predetermined block is the seventh block, the remaining blocks of key fob 22' may include blocks 1-6 and 8-N. Controller 84 may then write the data obtained from, for example, blocks 1-6 and 8-N of key fob 22 in corresponding remaining blocks (e.g. 1-6 and 8-N) of key fob 22'. The key fob data written in the remaining blocks of key fob 22' may be encrypted or unencrypted. For example, when controller 84 determines that key fob 22 is a low-frequency fob (see e.g. Step 504 of Method 500), controller 84 may write the data obtained from key fob 22 in the remaining blocks of key fob 22' without encrypting the data. In other exemplary embodiments, when controller 84 determines that key fob 22 is a high frequency fob (see e.g. Step 504 of Method 500), controller 84 may encrypt the data obtained from key fob 22 using the decryption key corresponding to the remaining blocks (e.g. 1-6 and 8-N). Controller 84 may transmit the encrypted data of key fob 22 to key fob 22' and cause the encrypted data to be written in the remaining blocks (e.g. 1-6 and 8-N) of key fob 22'. It is contemplated, however, that in some exemplary embodiments, controller 84 may cause unencrypted data of key fob 22 to be written in the remaining blocks (e.g. 1-6 and 8-N) of key fob 22' even though key fob 22 may be a high-frequency fob.

Method 600 may include a step of verifying the data written on key fob 22' (Step 608). In step 608, controller 84 may read the data stored in key fob 22'. Controller 84 may execute steps similar to those discussed above with respect to, for example, method 500 to read the data stored in key fob 22'. Controller 84 may compare the data read from key fob 22' with the data previously obtained from key fob 22. When the data read from key fob 22' matches the data obtained previously from key fob 22, controller 84 may determine that key fob 22' has been duplicated correctly. Controller 84 may then display a message on display 14 indicating that key fob 22 has been successfully duplicated. Controller 84 may proceed to step 418 of method 400.

The disclosed duplication device 10 may provide several advantages. For example, the disclosed duplication device 10 may help automate the complicated task of duplicating key fobs, while enhancing safety, convenience, and speed. By enabling duplication of both low-frequency and high-frequency key fobs duplication device 10 may allow a user to easily and conveniently duplicate most commonly used key fobs. Furthermore, by including the indicator data in the duplicated key fob 22' the disclosed duplication device 10 may help prevent further duplication of an already duplicated key fob. Additionally, because each duplicate key fob 22' includes the indicator data, when a duplicated key fob 22' is reported to be lost or stolen, it may be possible to program readers associated with access points to deny access, when a duplicate key fob 22' including the indicator value is presented to the reader.

It will be apparent to those skilled in the art that various modifications and variations can be made to the disclosed duplication device. Other embodiments will be apparent to those skilled in the art from consideration of the specification and practice of the disclosed duplication device. It is intended that the specification and examples be considered as exemplary only, with a true scope being indicated by the following claims and their equivalents.

What is claimed is:

1. A key fob duplication device, comprising:
    a housing;
    a display device attached to the housing; and
    a controller enclosed within the housing and configured to:
        read data stored in a first key fob;
        determine whether the first key fob can be duplicated based on the data;
        when the data indicates that the first key fob can be duplicated:
            generate a random number seed;
            generate an indicator value based on the random number seed; and
            write the data of the first key fob and the indicator value on a second key fob, wherein the indicator value is configured to indicate that the second key fob cannot be duplicated; and
        when the data indicates that the first key fob cannot be duplicated, display a message on the display device, indicating that the first key fob cannot be duplicated.

2. The key fob duplication device of claim 1, wherein the data is stored in the first key fob in a plurality of blocks and the controller is configured to determine whether the first key fob can be duplicated by:
  reading indicator data stored in a predetermined block selected from the plurality of blocks; and
  determining that the first key fob cannot be duplicated based on the indicator data.

3. The key fob duplication device of claim 2, wherein the controller is configured to determine that the first key fob cannot be duplicated when the indicator data includes a predetermined indicator value.

4. The key fob duplication device of claim 2, wherein the predetermined block is a seventh block selected from the plurality of blocks.

5. The key fob duplication device of claim 1, wherein the second key fob includes a plurality of blocks configured to store data, and the controller is configured to:
  write the indicator value in a predetermined block selected from the plurality of blocks of the second key fob; and
  write the data of the first key fob in blocks other than the predetermined block selected from the plurality of blocks.

6. The key fob duplication device of claim 1, further including a receptacle configured to sequentially receive the first key fob and the second key fob, wherein the controller is configured to:
  display instructions on the display device for positioning the first key fob adjacent to the receptacle;
  read the data stored in the first key fob when the first key fob is positioned adjacent to the receptacle;
  display instructions on the display device for positioning the second key fob adjacent to the receptacle; and
  write the data on the second key fob when the second key fob is positioned adjacent to the receptacle.

7. The key fob duplication device of claim 1, further including a transceiver configured to transmit the data received from the first key fob to a server.

8. The key fob duplication device of claim 7, wherein the controller is further configured to:
  display instructions on the display device, requesting identification information from a user;
  receive the identification information from the user; and
  transmit the identification information with the data received from the first key fob to the server.

9. The key fob duplication device of claim 1, wherein the controller is further configured to:
  transmit a notification to a user device associated with a user, the notification requesting the user to confirm that the user is allowed to duplicate the first key fob;
  receive, in response to the notification, a first input from the user device, the first input including identification information associated with the user;
  receive, from the display device associated with the key fob duplication device, a second input indicating that the identification information is valid; and
  write the data on the second key fob in response to receiving the first input and the second input.

10. A method of duplicating a key fob, comprising:
  reading, using a controller, data stored in a first key fob;
  determining, using the controller, whether the first key fob can be duplicated based on the data;
  when the controller determines that the first key fob can be duplicated:
    generating, using the controller, a random number seed;
    generating an indicator value based on the random number seed;
    writing, using the controller, the data of the first key fob and the indicator value on a second key fob, wherein the indicator value is configured to indicate that the second key fob is a copy of the first key fob;
    verifying, using the controller, that data stored in the second key fob corresponds to the data stored in the first key fob; and
    displaying, on a display device, a first message indicating that the first key fob has been duplicated; and
  when the controller determines that the first key fob cannot be duplicated, displaying, on the display device, a second message indicating that the first key fob cannot be duplicated.

11. The method of claim 10, further including:
  storing the indicator value in a database.

12. The method of claim 11, wherein
the second key fob includes a plurality of blocks, and writing the data further includes:
  writing, using the controller, the indicator value in a predetermined block selected from the plurality of blocks; and
  writing, using the controller, the data received from the first key fob in remaining blocks of the plurality of blocks.

13. The method of claim 10, wherein the data in the first key fob is stored in a plurality of blocks and determining whether the first key fob can be duplicated, includes:
  reading, using the controller, first data stored in a predetermined block selected from the plurality of blocks in the first key fob;
  comparing the first data with at least one indicator value stored in a database; and
  determining, using the controller, that the first key fob cannot be duplicated when the second indicator value matches the at least one indicator value.

14. The method of claim 13, wherein the predetermined block is a seventh block selected from the plurality of blocks.

15. The method of claim 10, further including:
  receiving, using a transceiver, identification information from a user device;
  transmitting, using the transceiver, the data and the identification information to a server; and
  storing the data in association with the identification information in a database.

16. The method of claim 10, further including:
  displaying instructions on the display device for positioning the first key fob proximate to a receptacle;
  reading the data stored in the first key fob when the first key fob is positioned proximate to the receptacle;
  displaying instructions on the display device for positioning the second key fob proximate to the receptacle; and
  writing the data on the second key fob when the second key fob is positioned proximate to the receptacle.

17. A method of duplicating a key fob, comprising:
  receiving, using an input device, identification information from a user;
  retrieving, from a database, data of a first key fob stored in association with the identification information;
  generating, using the controller, a random number seed;
  generating an indicator value based on the random number seed;
  writing, using a controller, the data of the first key fob and the indicator value on a second key fob, wherein the indicator value is configured to indicate that the second key fob cannot be duplicated;

verifying, using the controller, that data stored in the second key fob corresponds to the data retrieved from the database; and displaying, on a display device, a message indicating that the first key fob has been duplicated.

18. The method of claim 17, wherein the second key fob includes a plurality of blocks configured to store data of the second key fob, and writing the data further includes:

writing, using the controller, the indicator value in a predetermined block selected from the plurality of blocks; and writing, using the controller, the data of the first key fob in remaining blocks selected from the plurality of blocks.

19. The method of claim 17, wherein the identification information is first identification information and writing further includes:

transmitting a notification to a user device associated with the user, the notification requesting the user to confirm that the user is allowed to duplicate the first key fob;

receiving, using the controller, a first input from the user device in response to the notification, the first input including second identification information associated with the user;

receiving, using the controller, a second input indicating that the second identification information is valid; and writing the data of the first key fob and the indicator value on the second key fob in response to receiving the first input and the second input.

* * * * *